United States Patent
Enos et al.

(10) Patent No.: US 10,532,359 B2
(45) Date of Patent: Jan. 14, 2020

(54) CIRCULATING LIQUID BATH WITH DUAL RESERVOIR LEVEL SWITCH

(71) Applicant: Thermo Neslab Inc., Newington, NH (US)

(72) Inventors: Don A. Enos, Dover, NH (US); Robert L. Wiley, Stratham, NH (US); John L. Parker, Eliot, ME (US)

(73) Assignee: Thermo Neslab LLC, Waltham, MA (US)

( * ) Notice: Subject to any disclaimer, the term of this patent is extended or adjusted under 35 U.S.C. 154(b) by 0 days.

(21) Appl. No.: 13/659,459

(22) Filed: Oct. 24, 2012

(65) Prior Publication Data

US 2013/0105002 A1 May 2, 2013

Related U.S. Application Data

(60) Provisional application No. 61/552,742, filed on Oct. 28, 2011.

(51) Int. Cl.
*B01L 7/02* (2006.01)
*F24H 1/00* (2006.01)
(Continued)

(52) U.S. Cl.
CPC .............. *B01L 7/02* (2013.01); *F24H 1/0018* (2013.01); *F24H 9/2014* (2013.01);
(Continued)

(58) Field of Classification Search
CPC ............................. A47J 27/21158; B01L 7/02
(Continued)

(56) References Cited

U.S. PATENT DOCUMENTS

| 3,217,368 A | 11/1965 | Pototschnigg |
| 5,217,064 A * | 6/1993 | Kellow .................. A61J 1/165 165/254 |

(Continued)

FOREIGN PATENT DOCUMENTS

| CN | 201415135 Y | 3/2010 |
| CN | 201437350 U | 4/2010 |

(Continued)

OTHER PUBLICATIONS

JP 2005044740 (English abstract).*

(Continued)

*Primary Examiner* — Jonathan Bradford
(74) *Attorney, Agent, or Firm* — Wood Herron & Evans LLP

(57) ABSTRACT

A circulating bath (10) including a heater (18) configured to heat a fluid (34) in a reservoir (22). The heater (18) is configured to be operatively connected to a source of power (50) by a control circuit (39) operatively coupled to the heater (18). First and second fluid level sensors (14) (16) are operatively coupled to the control circuit (39), and provide signals indicative of a low fluid condition in the reservoir (22). The control circuit (39) is configured to receive the signals from the fluid level sensors (14) (16), and disconnect the heater (18) from the source of power (50) in response to receiving a signal from either of the first and second fluid level sensors (14), (16) indicative of a low fluid condition.

3 Claims, 5 Drawing Sheets

(51) Int. Cl.
- *H05B 3/78* (2006.01)
- *H05B 1/02* (2006.01)
- *F24H 9/20* (2006.01)
- *G01F 23/00* (2006.01)
- *H01H 35/18* (2006.01)
- *H01H 37/00* (2006.01)
- *G01F 23/70* (2006.01)
- *G01F 23/64* (2006.01)
- *G01F 23/30* (2006.01)

(52) U.S. Cl.
CPC ......... *G01F 23/0007* (2013.01); *H01H 35/18* (2013.01); *H01H 37/00* (2013.01); *H05B 1/0269* (2013.01); *H05B 3/78* (2013.01); *G01F 23/30* (2013.01); *G01F 23/64* (2013.01); *G01F 23/703* (2013.01); *Y10T 137/6416* (2015.04)

(58) Field of Classification Search
USPC ........................ 236/21 B, 21 R, 52; 165/11.1
See application file for complete search history.

(56) References Cited

U.S. PATENT DOCUMENTS

| | | | |
|---|---|---|---|
| 6,324,857 | B1 | 12/2001 | Hoefling |
| 6,863,805 | B1* | 3/2005 | Barreras et al. ............. 210/143 |
| 2004/0216862 | A1 | 11/2004 | Jucheim |
| 2005/0196314 | A1* | 9/2005 | Petersen ................ A61B 1/12 422/3 |
| 2006/0290525 | A1* | 12/2006 | Andersen .......... A61M 16/0051 340/632 |
| 2007/0051173 | A1* | 3/2007 | Baniahmad .......... G01F 23/243 73/291 |
| 2008/0042639 | A1* | 2/2008 | Oster ............ H03K 19/017572 324/133 |
| 2010/0166570 | A1* | 7/2010 | Hampton .............. F04B 49/065 417/36 |

FOREIGN PATENT DOCUMENTS

| | | |
|---|---|---|
| CN | 201454562 U | 5/2010 |
| CN | 201701948 U | 1/2011 |
| CN | 102103382 A | 6/2011 |
| CN | 201876737 U | 6/2011 |
| CN | 102152341 A | 8/2011 |
| CN | 201983423 U | 9/2011 |
| CN | 102213964 A | 10/2011 |
| CN | 201996324 U | 10/2011 |
| DE | 2644919 | 4/1978 |

OTHER PUBLICATIONS

"Redundant Tank Level Monitoring in Level Sensors." APG, Sep. 12, 2011, www.apgsensors.com/about-us/blog/redundant-tank-level-monitoring-level-sensors.*
"Redundancy in Technological Systems." Control Design, Mar. 11, 2010, https://www.controldesign.com/assets/10WPpdf/100310_PF_Redundancy.pdf (Year: 2010).*
European Patent Office, European Search Report of Application No. 12190028, dated May 7, 2013, 6 pages.
Espacenet, English machine translation of Application No. DE2644919, retrieved from http://worldwide.espacenet.com on May 22, 2013, 5 pages.
Espacenet, English Machine Translation of CN201415135Y, published Mar. 3, 2010, retrieved from http://worldwide.espacenet.com on May 4, 2015 (10 pages).
Espacenet, English Machine Translation of CN201454562U, published May 12, 2010, retrieved from http://worldwide.espacenet.com on May 4, 2015 (5 pages).
Espacenet, English Machine Translation of CN201701948U, published Jan. 12, 2011, retrieved from http://worldwide.espacenet.com on Apr. 29, 2015 (6 pages).
Espacenet, English Machine Translation of CN102103382A, published Jun. 22, 2011, retrieved from http://worldwide.espacenet.com on May 4, 2015 (7 pages).
Espacenet, English Machine Translation of Abstract for CN201876737U, published Jun. 22, 2011, retrieved from http://worldwide.espacenet.com on Apr. 29, 2015 (1 page).
Espacenet, English Machine Translation of CN201983423U, published Sep. 21, 2011, retrieved from http://worldwide.espacenet.com on Apr. 29, 2015 (9 pages).
Espacenet, English Machine Translation of CN201996324U, published Oct. 5, 2011, retrieved from http://worldwide.espacenet.com on Apr. 29, 2015 (4 pages).
Espacenet, English Machine Translation of CN102213964A, published Oct. 12, 2011, retrieved from http://worldwide.espacenet.com on Apr. 29, 2015 (15 pages).
Chinese Patent Office, Office Action for Application No. 201210449069.3, dated Feb. 12, 2015 (6 pages).
Chinese Patent Office, English Translation of Office Action for Application No. 201210449069.3, dated Feb. 12, 2015 (13 pages).
Espacenet, English Machine Translation of Abstract of CN201437350U, published Apr. 14, 2010, retrieved from http://worldwide.espacenet.com on Aug. 18, 2016 (1 page).
Espacenet, English Machine Translation of Abstract of CN102152341A, published Aug. 17, 2011, retreived from http://worldwide.espacenet.com on Aug. 18, 2016 (1 page).
State Intellectual Property Office of the People's Republic of China, Search Report, Patent Application No. 2012104490693, dated Jul. 13, 2016 (4 pages).
European Patent Office, Examination Report for EP12190028.6, dated Aug. 4, 2016 (5 pages).

* cited by examiner

CIRCULATING LIQUID BATH WITH DUAL RESERVOIR LEVEL SWITCH

CROSS-REFERENCE TO RELATED APPLICATIONS

This application claims the filing benefit of U.S. Provisional Application Ser. No. 61/552,742, filed Oct. 28, 2011 and entitled CIRCULATING LIQUID BATH WITH DUAL RESERVOIR LEVEL SWITCH, the disclosure of which is hereby incorporated herein by reference in its entirety.

FIELD OF THE INVENTION

The present invention relates to circulating liquid baths and, more particularly, to a safety mechanism for preventing a liquid over-temperature condition in a circulating liquid bath.

BACKGROUND OF THE INVENTION

Heating and/or cooling circulating baths are used in laboratory settings for providing a controlled temperature fluid, such as water. The end user may utilize the circulating bath by placing their application in the bath reservoir or by circulating the reservoir fluid between the bath reservoir and an external application. Conventional circulating bath applications may include placing beakers or other containers in the bath reservoir or controlling the temperature of an external jacketed vessel. The circulating bath moves the fluid past heating or cooling elements located in the bath reservoir so as to achieve a uniform desired fluid temperature.

Circulating baths typically operate over temperatures ranging from $-50°$ C. to $+300°$ C., depending on the configuration of the bath and its intended application. To prevent overheating and/or other dangerous conditions, circulating baths typically include a low fluid level detection device to shut down the system heater if the reservoir runs dry. The circulating bath will also typically include a high temperature limit switch to prevent the fluid or surfaces within the circulating bath from exceeding a safe temperature. The low fluid level detection device and high temperature limit switch thus provide two levels of safety for preventing the circulating bath from overheating. The high temperature limit switch typically includes a temperature sensing bulb that is attached to the top of a heater coil to monitor both heater and fluid temperatures. As the temperature of the bulb rises, fluid located within the bulb expands. This expanding fluid is typically coupled through a capillary tube to a diaphragm located within the switch housing. When the temperature of the expanding fluid exceeds a set-point temperature, the pressure exerted by the expanding fluid causes an electrical contact within the limit switch to open. Thus, if the temperature of the fluid in the bulb exceeds the set-point temperature, the resulting pressure trips the limit switch. Because the reservoir heater is coupled to power through the temperature limit switch, the temperature limit switch turns off the heating element within the circulating bath when the limit switch opens.

In order to be certified by Underwriters Laboratory, a circulating bath must meet the requirements of UL 61010-1 entitled "Electrical Equipment For Measurement, Control, and Laboratory Use" and in particular, Section 9.4 thereof entitled "Requirements for Equipment Containing or Using Flammable Liquids." This standard requires the maximum temperatures measured during testing to be at least 25° C. below the fire point of the recommended fluids for the circulating bath. The test may be conducted with one safety device at a time disabled, or placed in a fault condition, to determine if a single failure could result in a dangerous over-temperature condition. To create the highest possible surface temperatures that would be encountered during operation of the circulating bath, a test is done with a dry reservoir. The dry reservoir test simulates a situation that might arise if an operator forgot to add fluid to the reservoir or the fluid has drained from the reservoir. To simulate a failure of the reservoir level switch during this test, the reservoir level switch is faulted in the up, or full, position to provide a false indication that there is fluid in the reservoir.

During a reservoir level switch fault test, thermocouples for monitoring system temperatures are typically mounted to the heater near the high temperature limit bulb, and to other locations that may be expected to experience excessive temperatures based on a visual inspection of the circulating bath. The circulating bath is turned on with the reservoir empty. All thermocouples are then monitored for maximum temperatures achieved from the time the circulating bath is activated until after the high temperature limit switch has opened and the circulating bath has shut off. If the high temperature limit switch is working properly, the measured temperatures will not exceed the maximum allowable temperature for the particular fluids.

Because the high temperature limit bulb has thermal mass, the temperature of the sensing bulb may lag the temperature of the heating element, fluid, and/or other surfaces in the circulating bath. This lag may result in a temperature overshoot by the heating element due to the difference between the temperature of the heating element and the temperature of the sensing bulb. Therefore, to ensure that surface and fluid temperatures do not exceed the maximum allowable temperatures, it may be necessary to configure the high temperature limit switch to activate at a set-point temperature that is well below the maximum allowable temperature. Because of the rapid heating of high wattage density heating elements, thermal lag may result in significantly reduced operating temperatures. For example, when using silicone oil as a bath fluid, the set-point temperature may need to be 60° C. to 80° C. below the fluid fire point in order to meet the requirements of UL 61010-1 for a compact circulating bath. This problem may be further exacerbated by the reduced surface dimensions of the high temperature limit bulbs used in these compact circulating baths.

Thus, there is a need for improved systems and methods for monitoring the conditions of circulating baths to prevent the circulating bath from overheating.

SUMMARY OF THE INVENTION

In a first aspect of the invention, a circulating bath includes a heater configured to be operatively connected to a source of power and a control circuit. The control circuit is configured to selectively couple the heater to the power source and is operatively coupled to a first fluid level sensor and a second fluid level sensor. The control circuit receives signals from the fluid level sensors and disconnects the heater from the source of power in response to receiving a signal that indicates a low fluid condition from either one or both of the first and second fluid level sensors.

In another aspect of the invention, the circulating bath may further include a high temperature limit switch operatively coupled to the control circuit. In this embodiment, the control circuit may disconnect the heater from the power source in response to receiving a signal from the high temperature limit switch that indicates an over temperature condition in the circulating bath.

In yet another aspect of the invention, the first and second fluid level sensors may be coupled in series.

In still another aspect of the invention, the high temperature limit switch may be coupled in series with the first and second fluid level sensors.

In still another aspect of the invention, the high temperature limit switch and the first fluid level switch may be coupled to the control circuit through a first connector, and the second fluid level switch may be coupled to the control circuit through a second connector.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

Embodiments of the invention are generally related to a circulating bath designed to meet the requirements for a small footprint, high heater power, variable pump performance, and robust refrigeration system. To provide high heater power in a circulating bath having a reduced footprint, the heating elements may be compact and have high a wattage density. A low level detection circuit including two separate and independent level sensors allows the circulating bath to satisfy the testing requirements of UL 61010-1 without sacrificing desirable footprint and heater performance characteristics of the circulating bath. The second fluid level switch provides a redundant fluid level monitoring ability so that in the event one of the fluid level switches fails, the control circuit will still disconnect power to the heater in response to a low fluid level condition. Embodiments of the invention thus have two separate and independent fluid level switches which monitor the reservoir or reservoir fluid level. Both fluid level switches are configured to close on a fluid rise and are electrically coupled in series. The fluid level switches may be configured so that both switches are coupled to the control circuit through a single connector. In an alternative embodiment, each fluid level switch may be coupled to the control circuit through a separate connector. In yet another embodiment, one fluid level switch may be connected in series with the high temperature limit switch so that the fluid level switch and high temperature limit switch are both coupled to the control circuit though the same connector. The two fluid level switches may also be coupled to a limit circuit in the control circuit so that the heater power cutoff is not dependent on software control. In this way, the circulating bath may shut down the heater when a low level fault condition occurs even if there is a software fault.

Figure 1:
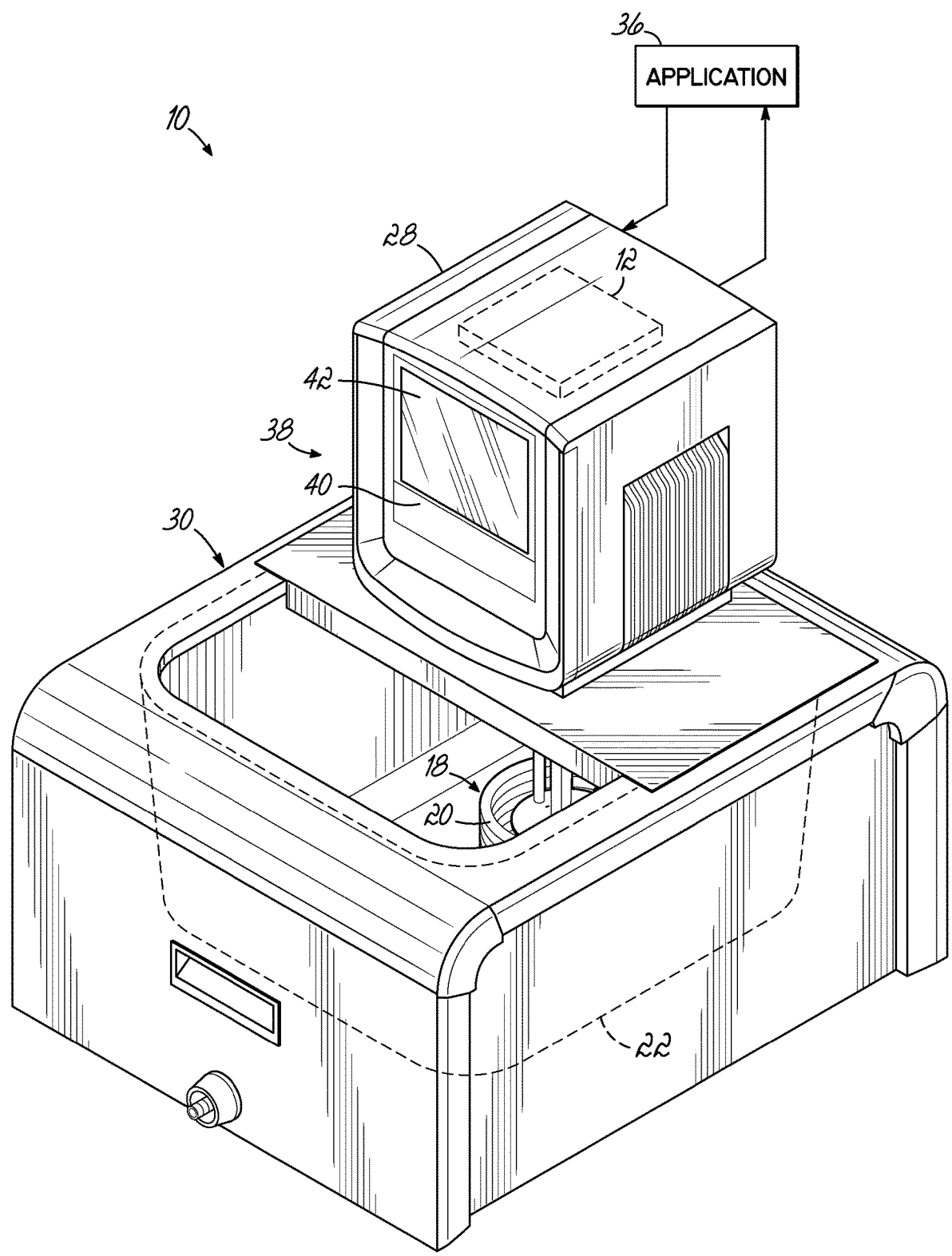
FIG. 1 is a perspective view of a circulating bath according to an embodiment of the invention.
Figure 2:
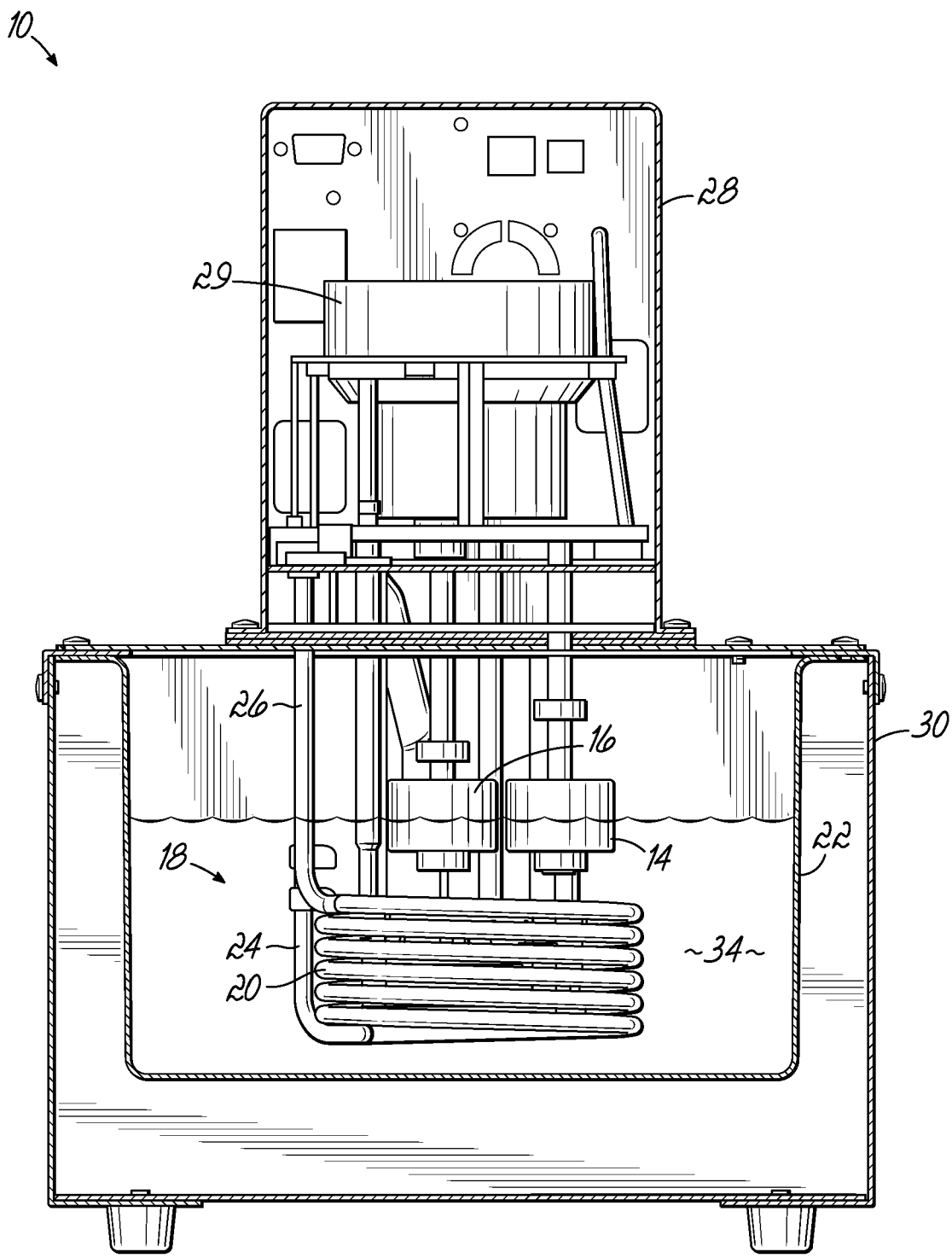
FIG. 2 is a diagrammatic cross-sectional front view of the circulating bath shown in FIG. 1 according to an embodiment of the invention.
Figure 3:
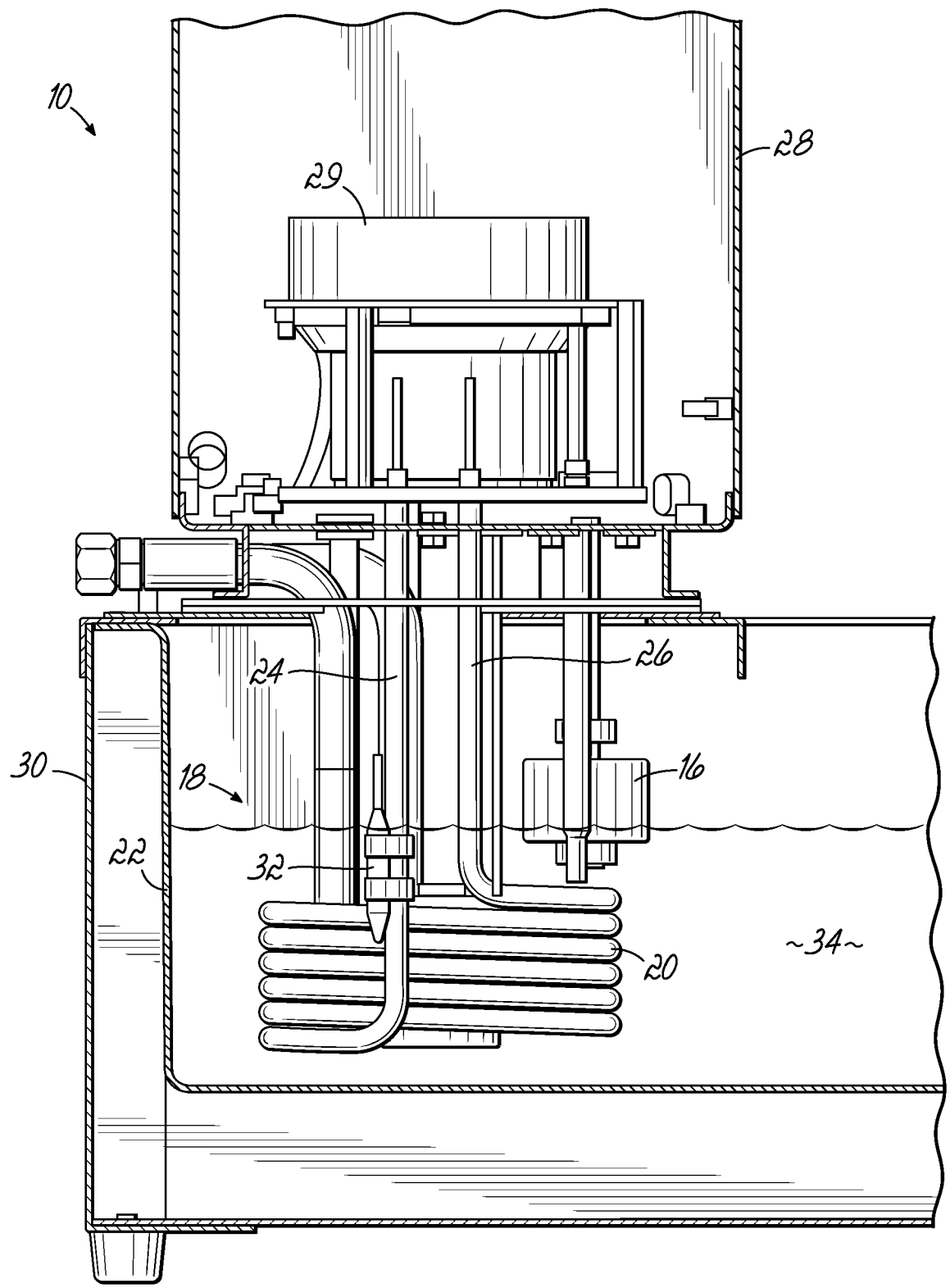
FIG. 3 is a diagrammatic cross-sectional side view of the circulating bath shown in FIG. 1 according to an embodiment of the invention.
Figure 4A:
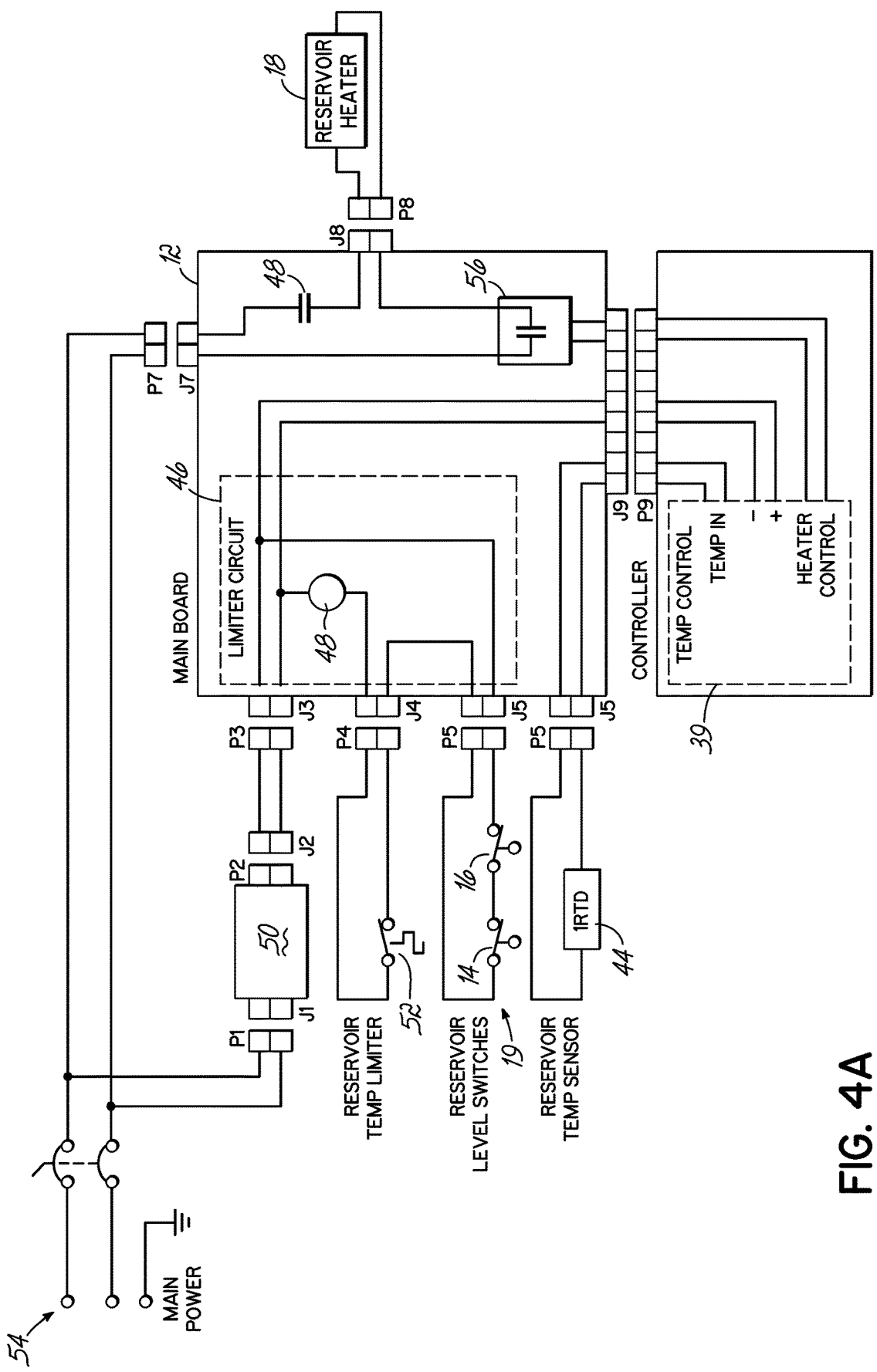
FIG. 4A is a schematic of the circulating control circuit including level and temperature control circuits according to an embodiment of the invention.

Referring now to FIGS. 1-3, in which like reference numerals refer to like elements, an exemplary circulating bath includes a control circuit 12 coupled to a first fluid level sensor or switch 14, a second fluid level sensor or switch 16, and a heater 18. The first and second fluid sensors or switches 14, 16 may comprise a low level detection circuit 19 operatively coupled to the control circuit 12 as shown in FIG. 4A. The heater 18 may include a hot zone or coil 20 configured to be immersed in a fluid 34 contained within a reservoir 22, and cold legs 24, 26 that operatively couple the coil 20 to the control circuit 12. The control circuit 12 and a portion of a circulating pump 29 may be enclosed by a housing 28 that is located on top of a reservoir housing 30. A high temperature limit bulb 32 may be fixed to one of the cold legs (illustrated in this representative embodiment as cold leg 24). The bulb 32 may be part of a high temperature limit device that includes a diaphragm activated switch that is operatively coupled to the control circuit 12. An example of a commercially available high temperature limit device includes part number 97.55134.116 available from EGO North America, Inc. of Newman Ga., United States. Advantageously, by mounting the high temperature limit bulb 32 to a cold leg 24, 26 of the heater 18, the high temperature limit circuit 35 may better monitor the temperature of the fluid 34. This may provide two benefits. The first is that the high temperature limit circuit 35 may monitor fluid temperature more accurately since the bulb 32 is not in contact with a hot heater surface. Secondly, this bulb mounting position may prevent premature heater cutoff due to issues with the heat removal rate from the heater 18 under all operation conditions with different fluids and pump speeds.

Circulating bath 10 may be used to circulate the fluid 34 between the reservoir 22 and an application 36, such as a heating or cooling jacket, in a known manner. To this end, the fluid 34 contained in the reservoir 22 may be drawn out of the reservoir 22 and conveyed to the application 36 via the circulation pump 29, and returned to the reservoir 22 from the application 36 in a closed-loop manner. In certain applications, the fluid 34 may be heated to a predetermined temperature in the reservoir 22 by the heater 18, which is at least partially immersed in the fluid 34, before the fluid 34 is conveyed to the application 36.

The control circuit 12 may include a temperature control circuit 39 configured to control the operation of the heater 18 to a desired temperature set point as is known in the art. In operation, the user may set a desired temperature for the fluid 34 through a user interface 38 including a control interface 40 and a display 42 accessible from outside the housing 28. The circulating bath 10 may also include a temperature sensor 44 (FIG. 4), such as a thermocouple, that is immersed in the fluid 34. The temperature sensor 44 may be coupled to the control circuit 12 and generate a signal indicative of the temperature of the fluid 34. In response to the signal from the temperature sensor 44, the control circuit 12 and/or temperature control circuit 39 may control the heat generated by the heater 18 so that the fluid 34 reaches and is maintained at the desired set point temperature.

Referring now to FIG. 4A, the control circuit 12 is illustrated according to one embodiment including a limiter circuit 46 and the temperature control circuit 39. The limiter circuit 46 includes a first electrically operated switch 48, such as a relay, operatively coupled to the first fluid level switch 14, the second fluid level switch 16, a direct current (DC) power supply 50, and a high temperature limit switch 52. The switch contacts of the relay 48 may couple the heater 18 to a suitable source of electric power, such as a 115 volt 60 hertz alternating current (AC) power line 54. The limiter circuit 46 is thereby configured so that the electrically operated switch 48 disconnects the AC power line 54 from the heater 18 if one or more of the first fluid level switch 14, second fluid level switch 16, or high temperature limit switch 52 is placed in an open state.

The temperature control circuit 39 may include a processor (not shown) and/or another electrical circuit that receives signals from the temperature sensor 44. The temperature control circuit 39 may also include a second electrically operated switch 56 (shown in representative form as a triac) and be operatively coupled to the user interface 38. The temperature control circuit 39 may be configured to receive input from the user interface 38 that defines a desired temperature set point for the fluid 34 contained within the reservoir. Based on signals received from the temperature sensor 44, the temperature control circuit 39 may selectively activate the heater 18 by closing the second electrically operated switch 56 so that the fluid 34 is warmed to the desired set point temperature. To this end, the temperature control circuit 39 may comprise a controller that uses a combination of one or more proportional, integral, and/or derivative control mechanisms as is known in the art of closed loop control systems.

In a specific embodiment of the invention, the first and second fluid level switches 14, 16 are dual level devices including a float and multiple switches in a single device. An example of a commercially available fluid level switch includes part number L312C6805-001 available from Innovative Solutions of Naugatuck, Conn., United States. Each of the first and second level switches 14, 16 is independent of the other switch, and has two sets of electrical connections that couple the switch to the control circuit 12. Each level switch 14, 16 may be utilized to monitor two conditions. The first condition may be a low level warning which informs the end user that the fluid 34 is getting low. The second condition may be a low level fault which shuts off the heater 18 and provides a fault status to the user in response to a low fluid level condition. The low level warning may be controlled through a software application running on a processor in the control circuit 12, and/or the low level fault may be controlled through a dedicated circuit in the control circuit to shut off the heater 18 without the use of software. The control circuit 12 may also include a software application running on a processor that acts as a software cutoff switch. To this end, the software application may monitor or sample signals from the temperature sensor 44 and cut off the heater 18 if the temperature of the fluid 34 rises above an upper threshold.

Figure 4B:
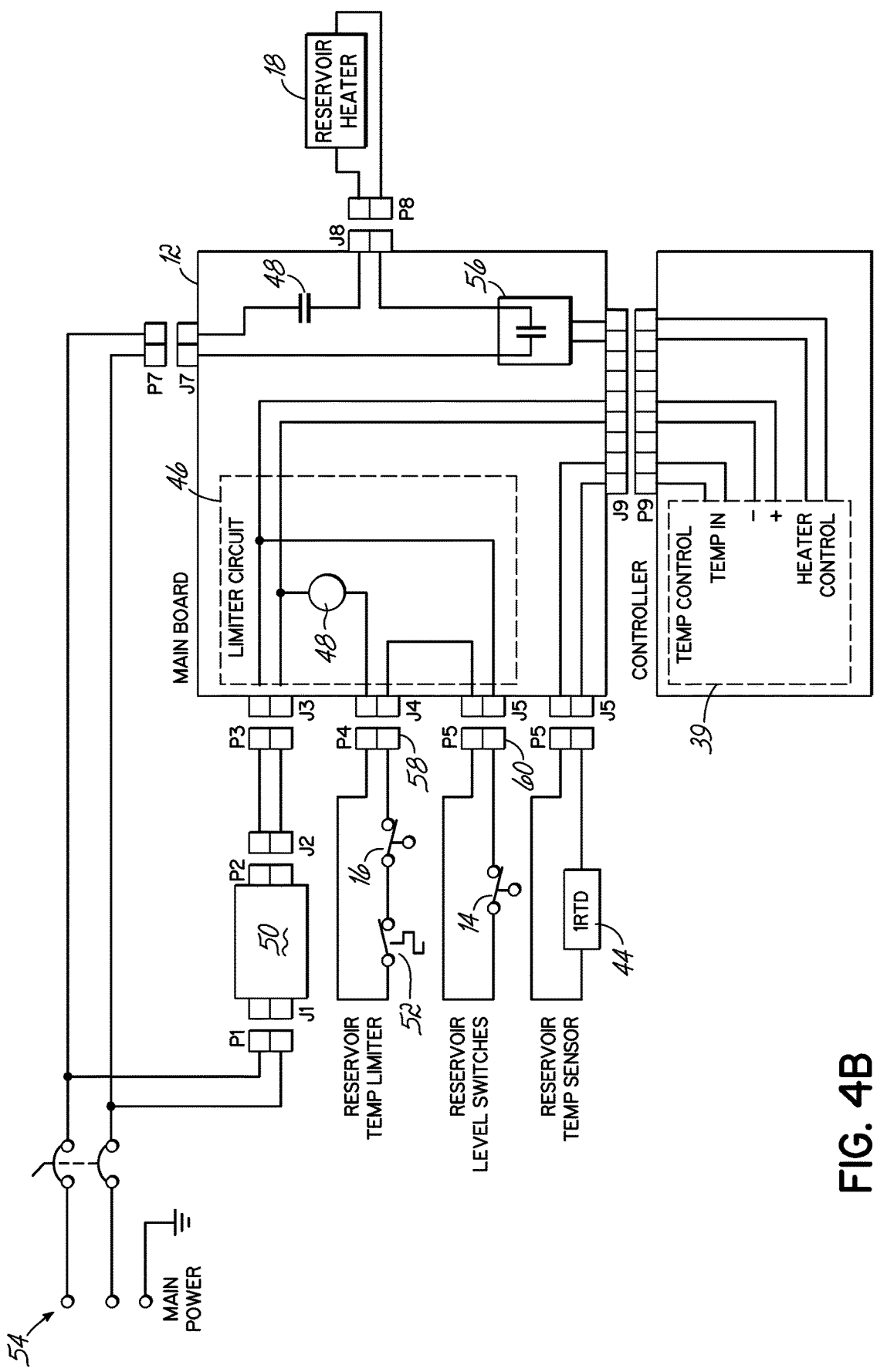
FIG. 4B is a schematic of the circulating control circuit including level and temperature control circuits according to an alternative embodiment of the invention.

Referring now to FIG. 4B, in which like reference numerals refer to like elements in FIGS. 1-3 and 4A, an alternative embodiment of the invention is presented. The control circuit 12 in FIG. 4B operates in essentially the same manner as described above with respect to FIG. 4A, except that the second fluid level switch 16 is relocated to share a connector 58 with the high temperature limit switch 52. By coupling the first and second fluid level switches 14, 16 to the control circuit 12 through separate connectors 58, 60, the control circuit 12 may cut off the heater under a low fluid condition even if there is a short across one of the connectors 58, 60.

While the invention has been illustrated by a description of various embodiments, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described herein. Accordingly, departures may be made from such details without departing from the spirit or scope of applicant's general inventive concept.

What is claimed is:

1. A circulating bath, comprising:
   a heater configured to be operatively connected to a source of power;
   a control circuit operatively coupled to the heater;
   a first fluid level sensor operatively coupled to the control circuit and configured to monitor a low fluid condition; and
   a second fluid level sensor electrically coupled in series with the first fluid level sensor, and the second fluid level sensor being operatively coupled to the control circuit and configured to monitor the same low fluid condition,
   a high temperature limit switch operatively coupled to the control circuit,
   wherein the control circuit is configured to disconnect the heater from the source of power in response to the control circuit receiving a signal from the high temperature limit switch of an over temperature condition, and
   wherein the control circuit is further configured to disconnect the heater from the source of power in response to the control circuit receiving a signal from either of the first and second fluid level sensors indicative of the same low fluid condition.

2. The circulating bath of claim 1, wherein the high temperature limit switch is electrically coupled in series with the first and second fluid level sensors.

3. The circulating bath of claim 1, wherein the high temperature limit switch and first fluid level sensor are coupled to the control circuit through a first connector, and the second fluid level sensor is coupled to the control circuit through a second connector different than the first connector.

* * * * *